US012609396B2

(12) United States Patent
Chi et al.

(10) Patent No.: US 12,609,396 B2
(45) Date of Patent: Apr. 21, 2026

(54) SECONDARY BATTERY MODULE AND METHOD FOR MANUFACTURING THE SAME

(71) Applicant: LG ENERGY SOLUTION, LTD., Seoul (KR)

(72) Inventors: Ho June Chi, Daejeon (KR); Hang June Choi, Daejeon (KR); Kyung Man Cho, Daejeon (KR); Jeong Oh Moon, Daejeon (KR); Su Hang Lee, Daejeon (KR); Yong Il Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 553 days.

(21) Appl. No.: 18/009,256

(22) PCT Filed: Sep. 30, 2021

(86) PCT No.: PCT/KR2021/013465
§ 371 (c)(1),
(2) Date: Dec. 8, 2022

(87) PCT Pub. No.: WO2022/075661
PCT Pub. Date: Apr. 14, 2022

(65) Prior Publication Data
US 2023/0216130 A1 Jul. 6, 2023

(30) Foreign Application Priority Data
Oct. 5, 2020 (KR) ........................ 10-2020-0128353

(51) Int. Cl.
*H01M 50/264* (2021.01)
*H01M 10/04* (2006.01)
(Continued)

(52) U.S. Cl.
CPC ..... *H01M 50/264* (2021.01); *H01M 10/0481* (2013.01); *H01M 50/20* (2021.01); *H01M 50/211* (2021.01); *H01M 50/293* (2021.01)

(58) Field of Classification Search
None
See application file for complete search history.

(56) References Cited

U.S. PATENT DOCUMENTS

2017/0365888 A1* 12/2017 Kwon .............. H01M 10/4207
2019/0131596 A1 5/2019 Yang et al.
(Continued)

FOREIGN PATENT DOCUMENTS

CN 208189662 U 12/2018
CN 209461535 U 10/2019
(Continued)

OTHER PUBLICATIONS

Machine translation of CN209461535 U printed Jun. 14, 2025 (Year: 2025).*
(Continued)

*Primary Examiner* — Maria Laios
(74) *Attorney, Agent, or Firm* — Birch, Stewart, Kolasch & Birch, LLP

(57) ABSTRACT

A secondary battery includes a plurality of secondary batteries, each secondary battery having two side surfaces that are flat and parallel to each other; and a housing having a bottom part formed in a horizontal direction, two vertical sidewalls extending parallel to each other in a longitudinal direction at opposite ends of the bottom part, and a ceiling part extending from an upper end of each of the sidewalls and disposed parallel to the bottom part. The plurality of secondary batteries are mounted to be stacked in a thickness direction thereof so that side surfaces of outermost secondary batteries of the plurality of secondary batteries face
(Continued)

respective sidewalls. A rib is formed inside each of edges connecting the bottom part and the sidewalls of the housing to each other to have a thickness thicker than other portions of the sidewalls.

12 Claims, 8 Drawing Sheets

(51) Int. Cl.
H01M 50/20 (2021.01)
H01M 50/211 (2021.01)
H01M 50/293 (2021.01)

(56) References Cited

U.S. PATENT DOCUMENTS

| | | |
|---|---|---|
| 2019/0267591 A1 | 8/2019 | Park et al. |
| 2019/0296289 A1 | 9/2019 | Yamamoto et al. |
| 2020/0127318 A1 | 4/2020 | Chi et al. |
| 2020/0144568 A1 | 5/2020 | Lee et al. |
| 2020/0176745 A1 | 6/2020 | Lee |
| 2021/0057689 A1 | 2/2021 | Park et al. |
| 2022/0209282 A1 | 6/2022 | Chi et al. |
| 2022/0231372 A1 | 7/2022 | Kim |

FOREIGN PATENT DOCUMENTS

| | | |
|---|---|---|
| CN | 111670516 A | 9/2020 |
| CN | 216085058 U | 3/2022 |
| EP | 3 641 004 A1 | 4/2020 |
| JP | 2014-93239 A | 5/2014 |
| JP | 2018-32519 A | 3/2018 |
| JP | 2020-77530 A | 5/2020 |
| KR | 10-2018-0113416 A | 10/2018 |
| KR | 10-2019-0078521 A | 7/2019 |
| KR | 10-2019-0086187 A | 7/2019 |
| KR | 10-2019-0090992 A | 8/2019 |
| KR | 10-2019-0112658 A | 10/2019 |
| KR | 10-2020-0008624 A | 1/2020 |
| KR | 10-2020-0030967 A | 3/2020 |
| KR | 10-2020-0052658 A | 5/2020 |
| KR | 10-2020-0068479 A | 6/2020 |
| KR | 10-2020-0077296 A | 6/2020 |
| KR | 10-2120933 B1 | 6/2020 |
| KR | 10-2128588 B1 | 7/2020 |
| WO | WO 2019/021778 A1 | 1/2019 |
| WO | WO 2020/116825 A1 | 6/2020 |

OTHER PUBLICATIONS

Extended European Search Report for European Application No. 21877913.0, dated Sep. 12, 2024.
International Search Report for PCT/KR2021/013465 mailed on Jan. 11, 2022.
European Communication pursuant to Article 94(3) EPC for European Application No. 21 877 913.0, dated Jun. 24, 2025.

* cited by examiner 3  1                                                      2

Thickness
direction

—30

Compression

Compression

30

Compression

SECONDARY BATTERY MODULE AND METHOD FOR MANUFACTURING THE SAME

TECHNICAL FIELD

The present application claims the benefit of the priority of Korean Patent Application No. 10-2020-0128353, filed on Oct. 5, 2020, which is hereby incorporated by reference in its entirety.

The present invention relates to a secondary battery module, in which a plurality of secondary batteries are mounted in a housing, and a method for manufacturing the same, and more particularly, to a secondary battery module, in which, when swelling occurs in secondary batteries mounted in a housing, behavior of the secondary battery disposed at the outermost side and behavior of lower ends of all the mounted secondary batteries are more stably controlled, and a method for manufacturing the same.

BACKGROUND ART

A secondary battery having a high energy density is mounted on an electric vehicle (EV) or a hybrid vehicle (HEV) driven by an electric driving source as well as a portable device.

Such a secondary battery is not only a primary advantage that the use of fossil fuels is significantly reduced, but also an additional advantage that is attracting attention as a new energy source for enhancing environment-friendliness and energy efficiency in that by-products due to the use of energy are not generated at all, and thus, studies on the secondary battery are actively carried out.

Secondary batteries that are widely used in recent years comprise lithium ion batteries, lithium polymer batteries, nickel-cadmium batteries, nickel-metal hydride batteries, and nickel-zinc batteries. Also, an operating voltage of a unit secondary battery cell, i.e., a unit battery cell is about 2.5 V to about 4.2 V.

Therefore, when a higher output voltage is required, a plurality of individual secondary batteries are connected to form a secondary battery module, and a plurality of secondary battery modules are assembled to form a secondary battery pack.

Here, the secondary battery module is configured by gathering cylindrical secondary batteries or by gathering pouch-type secondary batteries.

Among them, the secondary battery module constituted by the pouch-type secondary batteries has a structure, in which the secondary batteries 1 having two side surfaces, which are flat and parallel to each other, are mounted in a housing 2 having a rectangular cross-section in a thickness direction thereof as illustrated in FIG. 1a that illustrates a state in which the plurality of secondary batteries 1 are mounted in the housing 2 having the conventional structure. Also, a pad 3 made of an elastic material to buffer an external impact is mounted between an inner wall and the outermost shell of the housing 2.

In the case of the pouch-type secondary battery, due to a side reaction of repeated charging and discharging, an internal electrolyte is vaporized to generate a gas, thereby causing a swelling phenomenon, in which a volume of the secondary battery is expanded.

Here, the expansion of the secondary batteries may be controlled through rigidity of a material of the housing 2. However, when the volume of each of the secondary batteries 1 is expanded, the secondary battery 1 placed at the outermost side is more greatly deformed.

Also, since the swelling usually tends to swell at the middle portion of the secondary battery 1, an appearance when the swelling occurs in the secondary battery module according to the related art is simplified, and thus, the inner wall of the housing 2 is subjected to a greater pressure at a narrow point to deteriorate control efficiency of the swelling of the secondary battery 1.

That is, as illustrated in the cross-sectional view of the pad 3 disposed between the outermost secondary battery 1 and the inner wall of the housing 2, the pressure is concentrated only into a central portion of the inner wall of the housing 2 to generate compression. On the other hand, the pressure is not applied to both ends so as not to generate compression.

This is a problem that occurs because the pressure acting on the housing 2 is not dispersed, and there is a problem that the deformation of the housing 2 is relatively larger. In addition, while the large deformation occurring in the center of the secondary battery, both ends (upper and lower ends in FIGS. 1a and 1b) are not efficiently supported to cause a risk of damage. Particularly, when the secondary battery 1 is in contact with the housing 2, the secondary battery 1 moves in a state of being in close contact with the housing 2, and thus, friction occurs on the contact surface to cause a risk of tearing or damage of a pouch of the secondary battery 1. In addition, when the pouch is torn, not only the secondary battery 1 is broken, but also the secondary battery modules itself electrically connected to each other may have a defect.

DISCLOSURE OF THE INVENTION

Technical Problem

Therefore, a main object of the present invention is to provide a secondary battery module, in which, when swelling of the secondary batteries occurs, a pressure applied to a housing is more efficiently dispersed to minimize deformation of the housing, and both ends (upper and lower ends in FIGS. 1a and 1b) of the secondary battery is more efficiently supported, and a method for manufacturing the same.

Technical Solution

The present invention for achieving the above object provides a secondary battery module and a method for manufacturing the same.

A secondary battery module comprises: a plurality of secondary batteries, each secondary battery having two side surfaces that are flat and parallel to each other; and a housing comprising a bottom part extending in a horizontal direction, two vertical sidewalls extending parallel to each other in a longitudinal direction at opposite ends of the bottom part, and a ceiling part extending from an upper end of each of the sidewalls and disposed parallel to the bottom part, wherein the plurality of secondary batteries are mounted to be stacked in a thickness direction thereof so that side surfaces of outermost secondary batteries of the plurality of secondary batteries face respective sidewalls, and wherein a rib is located inside each of edges connecting the bottom part and the sidewalls of the housing to each other to have a thickness thicker than other portions of the sidewalls.

Each rib may be formed to have an inclined shape so that the thickness of the rib gradually increases from a corresponding one of the sidewalls to the bottom part.

In addition, the secondary battery module may further comprise a pad made of an elastic material and may be disposed between each of the sidewalls and an outermost side surface of each of the outermost secondary batteries.

Each pad may be in a state of being pressed at a point that is in contact with a corresponding rib of the sidewalls.

Each rib may be located inside each of an edge connecting an end of one side of the bottom part to each of the sidewalls and an edge connecting an end of another side of the bottom part to each of the sidewalls.

A resin to fix the secondary batteries is applied to one or more of a surface of the bottom part and a surface of the ceiling part facing the secondary batteries.

The housing may include a chamfer located outside each of edges connecting the opposite ends of the bottom part to the sidewalls and edges connecting opposite ends of the ceiling part to the sidewalls.

The secondary battery module may include an additional pad located between two adjacent second batteries of the plurality of batteries between the two outermost secondary batteries.

Furthermore, the present invention may additionally provide a method for manufacturing the secondary battery module having the above-described configuration.

A method for manufacturing a secondary battery module, in which a plurality of secondary batteries are mounted in a housing, according to the present invention comprises: a process of mounting a pair of pads in the housing, the housing including a bottom part extending in a horizontal direction, two vertical sidewalls extending parallel to each other in a longitudinal direction at opposite ends of the bottom part, and a ceiling part extending from an upper end of each of the sidewalls and disposed parallel to the bottom part; and a process of mounting the plurality of secondary batteries in the housing so that each pad is in contact with a corresponding one of the sidewalls, wherein, in the process of mounting the secondary batteries in the housing, the secondary batteries are mounted to be stacked so that at least a portion of each pad is pressed between the corresponding one of the sidewalls of the housing and a side surface of each of the outermost secondary batteries of the plurality of secondary batteries.

A rib may be located inside an edge connecting the bottom part to each of the sidewalls to have a thickness thicker than other portions of the sidewalls so that each pad is pressed by a corresponding rib while the secondary batteries are mounted.

The method may further comprise a process of applying a resin to one or more of a surface of the bottom part and a surface of the ceiling part to fix the secondary batteries.

The method may further include providing an additional pad between two adjacent second batteries of the plurality of batteries between the two outermost secondary batteries.

Advantageous Effects

In the secondary battery module according to the present invention, the rib may be formed inside each of the bottom part and sidewall of the housing to more efficiently support the end of the secondary battery (the lower end in reference to FIG. 2). Thus, the movement of the end (the lower end) of the secondary battery may be prevented to suppress the damage.

In more detail, it is possible to prevent the pouch from being damaged due to the friction between the secondary battery and the housing. In addition, when the cooling device is coupled to the outside of the bottom part of the housing, the movement of the lower end of the secondary battery may be fixed to be maintained at its original position, thereby preventing the cooling efficiency from being deteriorated and also further reducing the possibility of occurrence of the damage.

In addition, in the present invention, since the pad is mounted in the previously compressed state by the rib, the movement of the lower end of the secondary battery may be relatively more firmly supported, and the resin may be additionally applied to the bottom surface of the housing to more reduce the possibility of the movement of the lower end of the secondary battery.

MODE FOR CARRYING OUT THE INVENTION

Figure 1A:
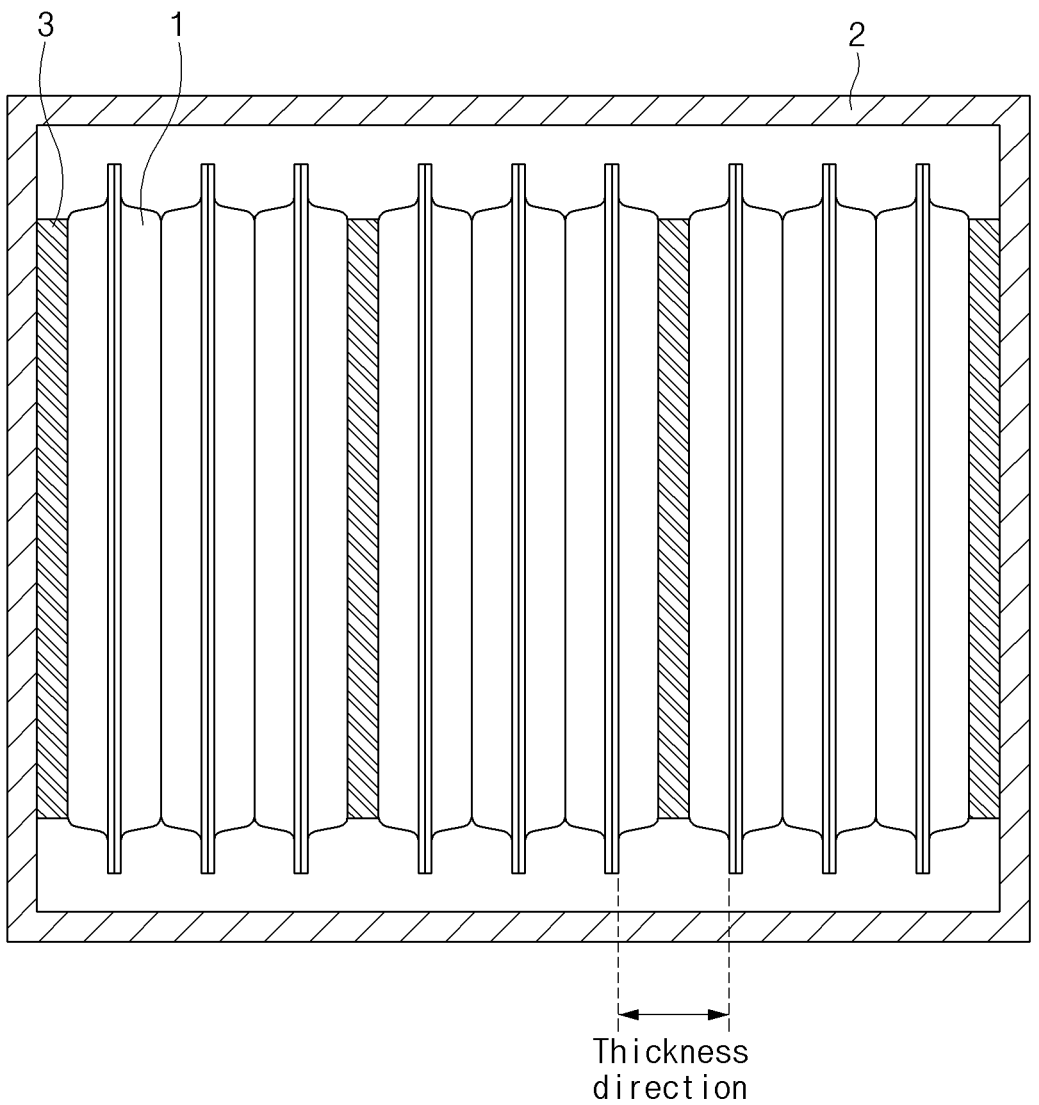
FIG. 1a is a view illustrating a state in which a plurality of secondary batteries are mounted in a housing having a structure according to a related art.
Figure 1B:
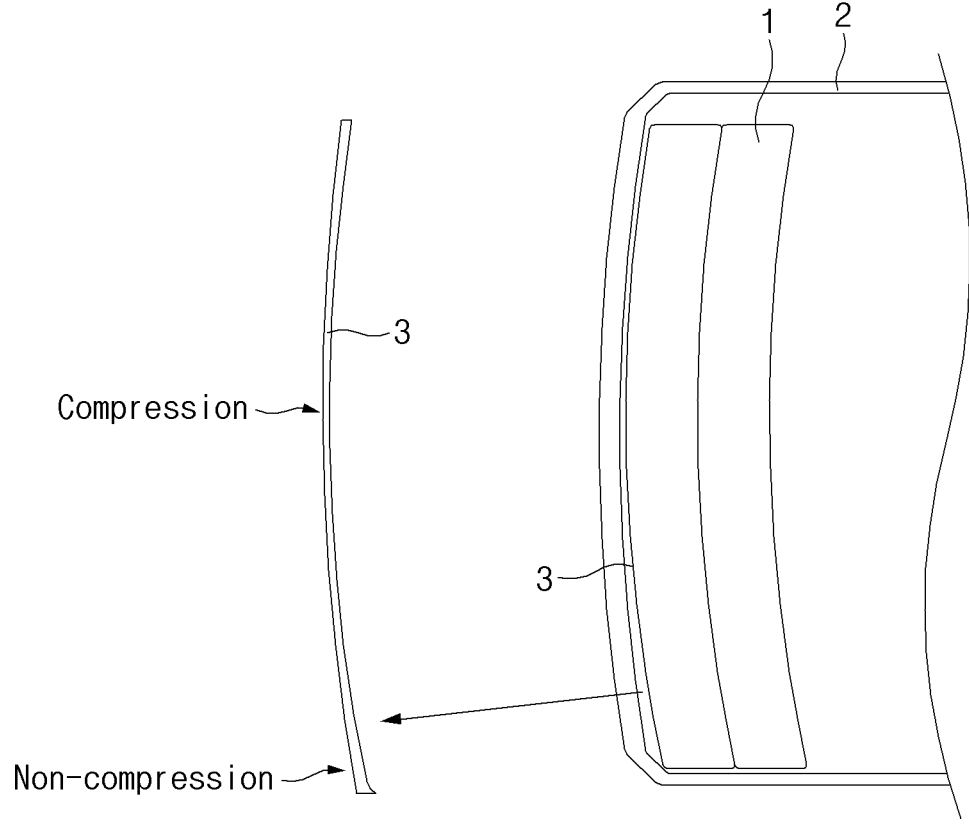
FIG. 1b is a simplified view illustrating a state when swelling occurs in a secondary battery module according to the related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly describe the present invention, parts irrelevant to the description are omitted, and the same reference numerals are assigned to the same or similar components throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a secondary battery module, in which a plurality of secondary batteries are mounted in a housing, and a method for manufacturing the same. Hereinafter, embodiments according to the present invention will be described in more detail with reference to the accompanying drawings.

First Embodiment

The present invention provides a method for manufacturing a secondary battery module as a first embodiment. FIG.

Figure 2:
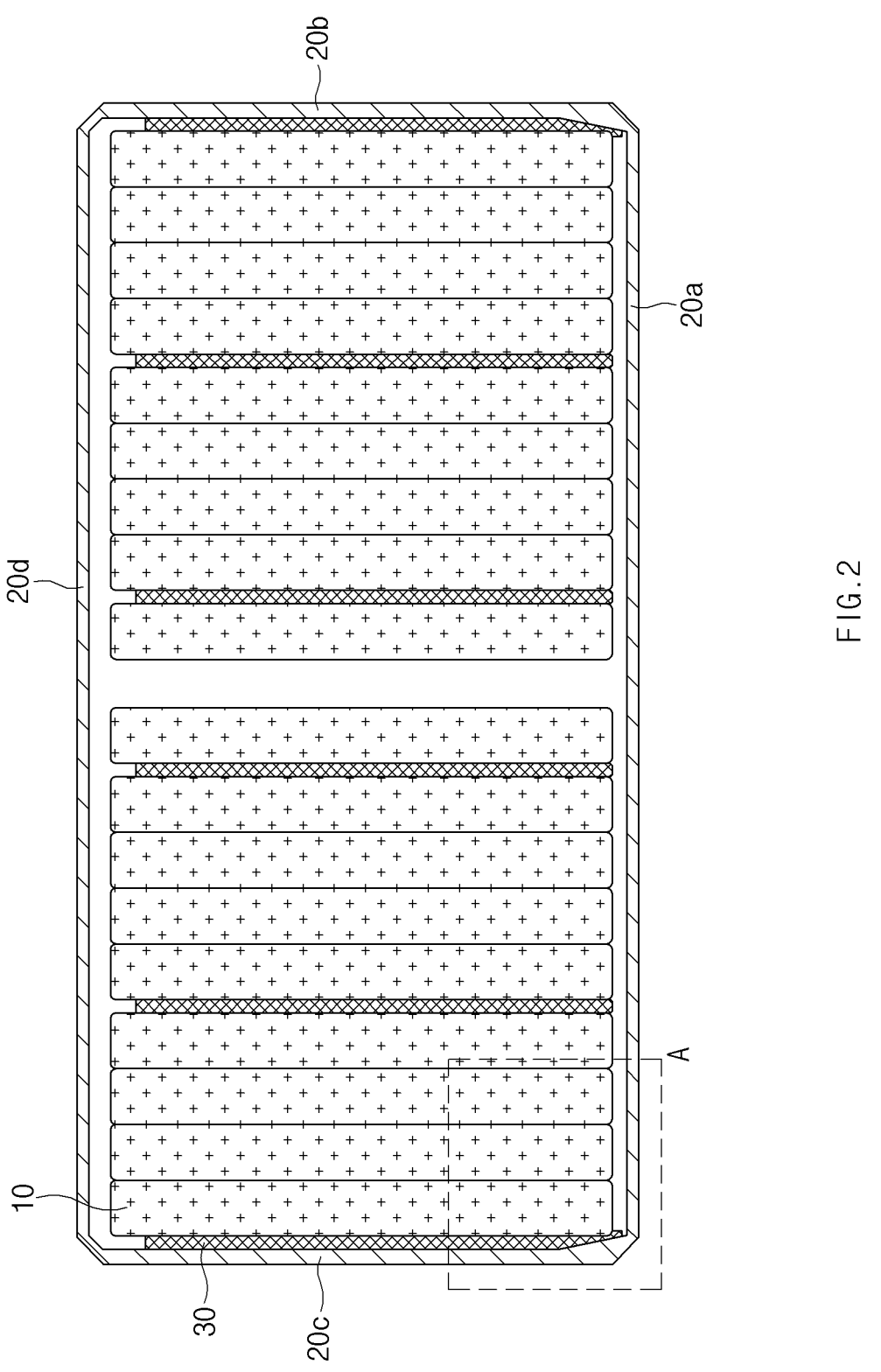
FIG. 2 is a cross-sectional view illustrating a secondary battery according to the present invention.
Figure 3:
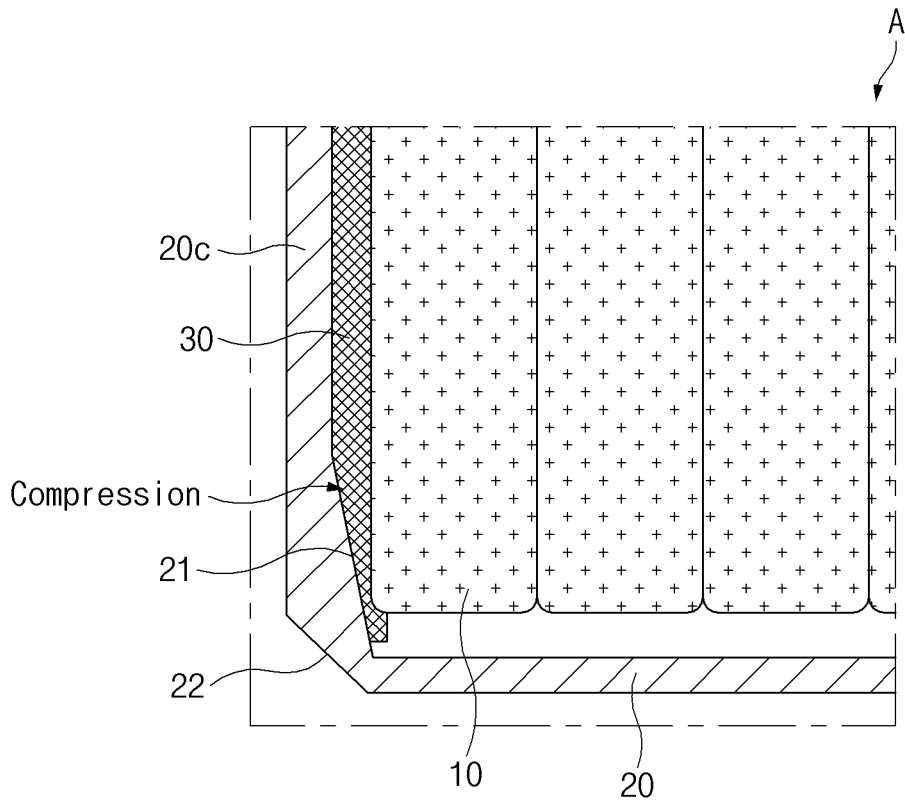
FIG. 3 is an enlarged view illustrating a portion A of FIG. 2.
Figure 4:
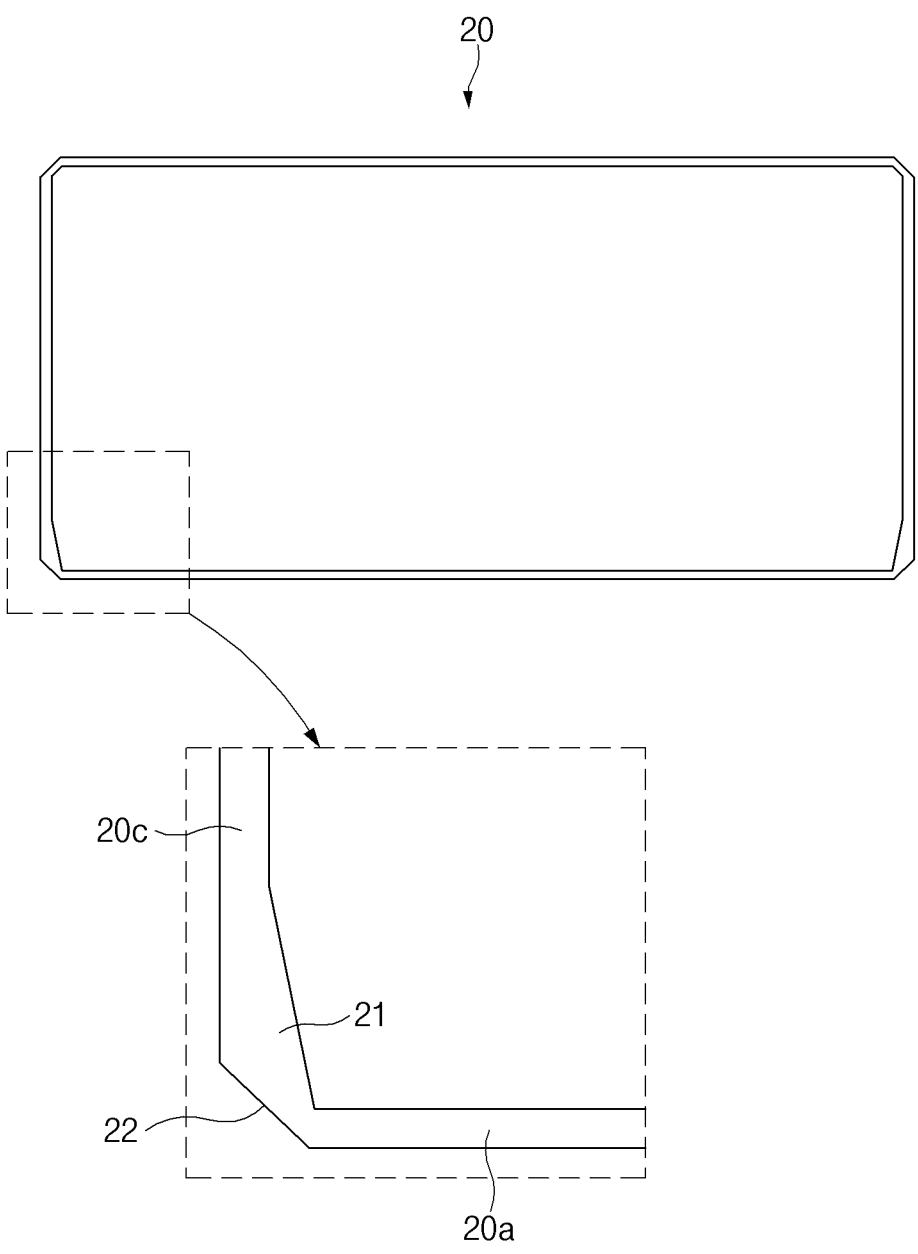
FIG. 4 is a partial enlarged view illustrating a housing according to the present invention.

2 is a cross-sectional view illustrating a secondary battery according to the present invention, FIG. 3 is an enlarged view illustrating a portion A of FIG. 2, and FIG. 4 is a partial enlarged view illustrating a housing according to the present invention.

Referring to the drawings, a method for manufacturing a secondary battery module provided in the present invention comprises a process of mounting a plurality of secondary batteries 10 in a housing 20, i.e., comprises a process of mounting a pad 30 in the housing 20 and a process of mounting the secondary batteries 10 in the housing 20 and a process of mounting the secondary batteries in the housing 20.

The housing 20 provided in this embodiment comprises a bottom part 20a formed in a horizontal direction, two sidewalls 20b and 20c that are vertically erected in parallel to each other in a longitudinal direction at both ends of the bottom part 20a, and a ceiling part 20d extending from an upper end of each of the sidewalls 20b and 20c and disposed parallel to the bottom part 20a.

In addition, both the sidewalls 20b and 20c of the housing 20 are mounted before the secondary batteries 10 are mounted so that the pad 30 is in contact with both the sidewalls 20b and 20c.

In the process of mounting the pad 30 in the housing 20, the pad 30 has both surfaces parallel to each other. Here, one surface of both the surfaces of the pad 30 is mounted to be in contact with the sidewalls 20b and 20c.

When the pad 30 is completely mounted, the process of mounting the secondary batteries 10 in the housing 20 is performed. The predetermined number of secondary batteries 10 are mounted with the pads 30 between both the sides thereof. The secondary batteries 10 may be mounted one by one through an opened portion of the housing 20, or the plurality of stacked secondary batteries 10 may be mounted in the housing 20. Also, at this time, the pad 30 may be additionally mounted at intervals between the predetermined number of secondary batteries 10.

Particularly, the pad 30 disposed at the outermost side, which is provided in this embodiment, has at least a portion of the pad 30, which is previously pressed between the sidewalls 20b and 20c of the housing 20 and the side surface of the secondary battery 10.

That is, a rib 21 is formed inside each of edges connecting the bottom part 20a and the sidewalls 20b and 20c of the housing 20 to have a thickness thicker than other portions so that the pad 30 is previously pressed by the rib 21 while the mounting of the secondary batteries 10 are performed.

A process of applying a resin 40 on an inner surface of the bottom part 20a or the ceiling part 20d may be additionally performed before the process of mounting the pad 30 in the housing 20 or between the process of mounting the pad 30 in the housing 20 and the process of mounting the secondary batteries 10 in the housing 20.

Figure 6:
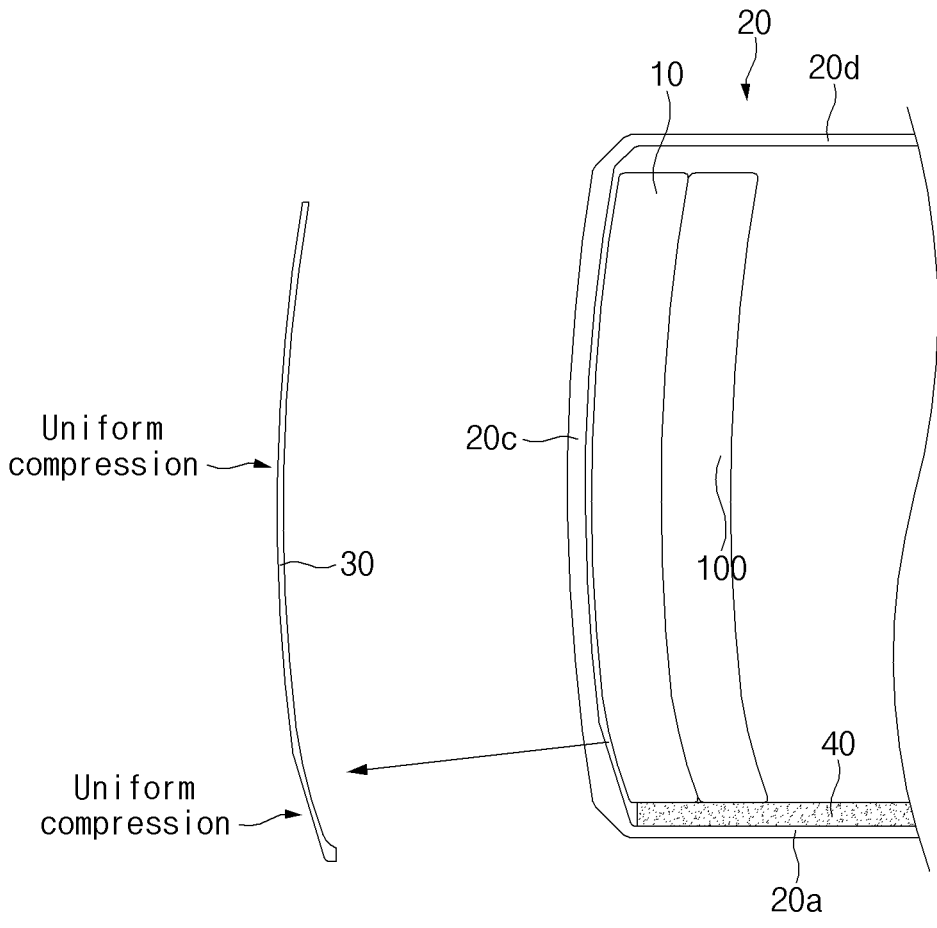
FIG. 6 is a simplified view illustrating a state in which swelling occurs in the secondary battery module according to the present invention.

That is, as illustrated in FIG. 6, which illustrates a simplified state when swelling occurs in the secondary battery module according to the present invention, the resin 40 may be applied to control behavior of the upper or lower end of the secondary battery 10 at a side of the bottom part 20a or the ceiling part 20d of the housing, which is in contact with the secondary battery 10.

Second Embodiment

The present invention provides a secondary battery module manufactured by the manufacturing method according to the first embodiment as a second embodiment.

The secondary battery module provided in this embodiment has a structure, in which a plurality of secondary batteries 10 is mounted in a housing 20, and a pad 30 is mounted between the outermost secondary battery 10 of the secondary batteries 10 and sidewalls 20b and 20c of the housing 20.

The secondary battery 10 is a conventional pouch-type secondary battery having a structure in which an electrode assembly is mounted in a pouch and which has two flat side surfaces parallel to each other.

The housing 20 comprises a bottom part 20a formed in a horizontal direction, two sidewalls 20b and 20c that are vertically erected in parallel to each other in a longitudinal direction at both ends of the bottom part 20a, and a ceiling part 20d extending from an upper end of each of the sidewalls 20b and 20c and disposed parallel to the bottom part 20a.

Also, the plurality of secondary batteries 10 are stacked in a thickness direction, and side surfaces of both the outermost secondary batteries 10 are mounted in the housing 20 to face the sidewalls 20b and 20c, respectively.

In the housing 20 provided in this embodiment, rib 21 is formed inside each of edges connecting the bottom part 20a and the sidewalls 20b and 20c of the housing 20 to each other to have a thickness thicker than other portions.

The rib 21 is formed to have an inclined shape so that the thickness thereof gradually increases from each of the sidewalls 20b and 20c to the bottom part 20a.

As illustrated in FIGS. 2 and 4, in the housing 20 provided in this embodiment comprises, the ribs 21 are formed inside each of the edge connecting an end of one side of the bottom part 20a to the one sidewall 20b and the edge connecting an end of the other side of the bottom part 20a to the other sidewall 20b, respectively.

Furthermore, although not shown in the drawings, the rib 21 may be formed inside each of the edge connecting an end of one side of the ceiling part 20d to the one sidewall 20b and the edge connecting an end of the other side of the ceiling part 20d to the other sidewall 20c.

Also, a pad 30 made of an elastic material is mounted between each of the sidewalls 20b and 20c of the housing 20 and the side surface of the outermost secondary battery 10.

Figure 5A:
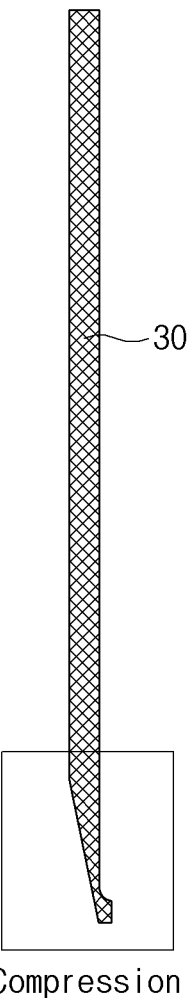
FIG. 5a is a view illustrating a state in which only a lower end of a pad is pressed between the outermost secondary battery and a sidewall of the housing.
Figure 5B:
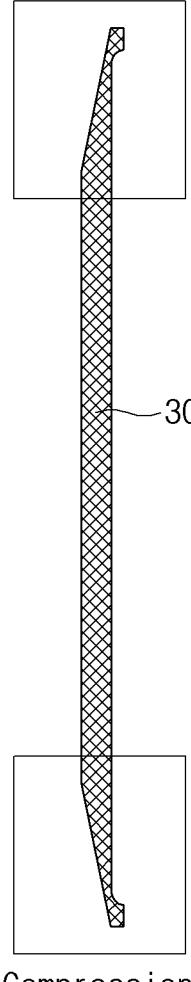
FIG. 5b is a view illustrating a state in which only both upper and lower ends of the pad are pressed between the outermost secondary battery and the sidewall of the housing.

Thus, as illustrated in FIG. 5a, which illustrates a state in which only a lower end of the pad 30 is pressed between the outermost secondary battery 10 and each of the sidewall 20b and 20c of the housing 20, and FIG. 5b, which illustrates a state in which both upper and lower ends of the pad are pressed between the outermost secondary battery 10 and each of the sidewalls 20b and 20c of the housing 20, the pad 30 may be mounted in a state, in which only the lower end of the pad 30 is pressed, or both the lower and upper ends of the pad 30 are pressed according to the number of times of formation of the rib 21.

That is, the pad 30 is disposed between each of the sidewalls 20b and 20c and the side surface of the secondary battery 10 in a state of being pressed at a point that is in contact with the rib 21. Therefore, as illustrated in FIG. 6, which illustrates a simplified state when swelling occurs in the secondary battery module according to the present invention, when the swelling of the secondary batteries 10 occurs, since a central portion of the pad 30 is pressed by the swelling, and the lower end (and the upper end) of the pad 30, the entire pad 30 may be uniformly pressed.

Also, as illustrated in FIG. 6, a resin 40 adhering to fix the secondary battery 10 is applied to one or more of a surface of the bottom part 20*a* and a surface of the ceiling part 20*d*, which face both sides of the secondary battery 10, respectively.

Therefore, in the secondary battery module provided in this embodiment, since the lower end of the secondary battery 10 is fixed by the resin 40 and supported by the previously pressed pad 30, movement of the pad 30 due to elastic deformation thereof is restricted (since the lower end of the pad is previously pressed, a compressible amount of pad is reduced to reduce a range in which the secondary battery moves).

Thus, even if the secondary batteries 10 are swollen due to the swelling, the lower end of the secondary battery 10 may be fixed at the bottom part of the housing 20 to prevent the secondary battery 10 from being damaged. That is, sliding of the secondary battery 10 may be fixed at the bottom part 20*a* to prevent the secondary battery pouch from being damaged due to pushing of the secondary battery 10 (since the lower end of the secondary battery is attached to be fixed by the resin 40, if the lower end of the secondary battery is pushed to move, the lower end of the secondary battery may be easily damaged).

A chamfer 22 is formed in a shape, of which a sharp portion is chamfered, outsides of each of the edges connecting both the ends of the bottom part 20*a* to the sidewalls 20*b* and 20*c* and the edges connecting the ends of both the sides of the ceiling part 20*d* to the sidewalls 20*b* and 20*c*.

In the secondary battery module according to the present invention, the ribs 21 may be formed inside the bottom part 20*a* and the sidewalls 20*b* and 20*c* of the housing 20 to more efficiently support the end (the lower end in FIG. 2) of the secondary battery. Therefore, it is possible to restrict the movement of the lower end of the secondary battery 10, thereby suppressing the damage of the secondary battery 10.

In more detail, it is possible to prevent the pouch from being damaged due to friction between the secondary battery 10 and the housing 20. In addition, when the cooling device is coupled to the outside of the bottom part of the housing, the movement of the lower end of the secondary battery may be fixed to be maintained at its original position, thereby preventing the cooling efficiency from being deteriorated and also further reducing the possibility of occurrence of the damage.

In addition, in the present invention, since the pad 30 is mounted in the previously compressed state by the rib 21, the movement of the lower end of the secondary battery 10 may be relatively more firmly supported, and the resin 40 may be additionally applied to the bottom surface of the housing 20 to more reduce the possibility of the movement of the lower end of the secondary battery 10.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Secondary battery

20: Housing

30: Pad

40: Resin

The invention claimed is:

1. A secondary battery module, comprising:
a plurality of secondary batteries, each secondary battery having two side surfaces that are flat and parallel to each other; and
a housing comprising a bottom part extending in a horizontal direction, two vertical sidewalls extending parallel to each other in a longitudinal direction at opposite ends of the bottom part, and a ceiling part extending from an upper end of each of the sidewalls and disposed parallel to the bottom part,
wherein the plurality of secondary batteries are mounted to be stacked in a thickness direction thereof so that side surfaces of outermost secondary batteries of the plurality of secondary batteries face respective sidewalls,
wherein a rib is located inside each of edges connecting the bottom part and the sidewalls of the housing to each other to have a thickness thicker than other portions of the sidewalls, and
wherein each side surface of each secondary battery has a length and a width that are greater than a thickness of the secondary battery.

2. The secondary battery module of claim 1, wherein each rib is formed to have an inclined shape so that the thickness of the rib gradually increases from a corresponding one of the sidewalls to the bottom part.

3. The secondary battery module of claim 2, further comprising a pad made of an elastic material disposed between each of the sidewalls and an outermost side surface of each of the outermost secondary batteries.

4. The secondary battery module of claim 3, wherein each pad is in a state of being pressed at a point that is in contact with a corresponding rib of the sidewalls.

5. The secondary battery module of claim 3, further comprising an additional pad located between two adjacent second batteries of the plurality of secondary batteries between the outermost secondary batteries.

6. The secondary battery module of claim 2, wherein each rib is located inside each of an edge connecting an end of one side of the bottom part to each of the sidewalls and an edge connecting an end of another side of the bottom part to each of the sidewalls.

7. The secondary battery module of claim 1, wherein a resin to fix the secondary batteries is applied to one or more of a surface of the bottom part and a surface of the ceiling part facing the secondary batteries.

8. The secondary battery module of claim 1, wherein the housing includes a chamfer located outside each of edges connecting the opposite ends of the bottom part to the sidewalls and edges connecting opposite ends of the ceiling part to the sidewalls.

9. A method for manufacturing a secondary battery module according to claim 1, the method comprising:
a process of mounting a pair of pads in the housing; and
a process of mounting the plurality of secondary batteries in the housing so that each pad is in contact with a corresponding one of the sidewalls,
wherein, in the process of mounting the secondary batteries in the housing, the secondary batteries are mounted to be stacked so that at least a portion of each pad is pressed between the corresponding one of the sidewalls of the housing and a side surface of each of the outermost secondary batteries of the plurality of secondary batteries.

10. The method of claim 9, wherein each pad is pressed by a corresponding rib while the secondary batteries are mounted.

11. The method of claim 9, further comprising a process of applying a resin to one or more of a surface of the bottom part and a surface of the ceiling part to fix each of the secondary batteries.

12. The method of claim 9, further comprising providing an additional pad between two adjacent second batteries of the plurality of secondary batteries between the outermost secondary batteries.

\* \* \* \* \*